United States Patent [19]
Beekman et al.

[11] Patent Number: 5,866,625
[45] Date of Patent: Feb. 2, 1999

[54] PVC FOAM COMPOSITIONS

[75] Inventors: George F. Beekman, Westchester; Lionel R. Price, Cincinnati, both of Ohio

[73] Assignee: Morton International, Inc., Chicago, Ill.

[21] Appl. No.: 936,133

[22] Filed: Sep. 24, 1997

Related U.S. Application Data

[62] Division of Ser. No. 820,192, Mar. 19, 1997, Pat. No. 5,710,188.

[51] Int. Cl.$^6$ ........................................................ C08J 9/00
[52] U.S. Cl. .................................. 521/89; 521/79; 521/81; 521/134; 521/145; 524/156; 524/184; 524/186; 524/201; 524/301; 524/329
[58] Field of Search ................................. 521/79, 81, 93, 521/134, 145; 524/156, 184, 186, 201, 301, 329

[56] References Cited

U.S. PATENT DOCUMENTS

| | | | |
|---|---|---|---|
| 3,706,679 | 12/1972 | Hopton et al. | 521/51 |
| 3,953,385 | 4/1976 | Dworkin et al. | 521/89 |
| 4,032,468 | 6/1977 | Treadwell et al. | 252/182 |
| 4,698,368 | 10/1987 | Miller | 521/93 |
| 4,977,193 | 12/1990 | Croce et al. | 521/85 |

*Primary Examiner*—Morton Foelak
*Attorney, Agent, or Firm*—Robert M. Didrick; Gerald K. White

[57] ABSTRACT

The density of rigid foamed articles made by the thermal decomposition of a blowing agent in a vinyl chloride polymer is reduced by the use of an organotin halide in combination with a mercaptocarboxylic acid ester or a sulfide of such ester or a mixture of the ester and the sulfide to activate the blowing agent.

9 Claims, No Drawings

PVC FOAM COMPOSITIONS

This is a divisional of application Ser. No. 08/820,192 filed on Mar. 19, 1997, now U.S. Pat. No. 5,710,188.

BACKGROUND OF THE INVENTION

This invention relates to the preparation of cellular vinyl chloride polymers. It relates more particularly to combinations of certain organotin compounds which are superior activators for blowing agents employed in the preparation of cellular vinyl chloride polymers.

One important utility for vinyl chloride resins is in the preparation of rigid foamed articles. The articles are manufactured by known methods such as extrusion of a blend of the resin and additives with a suitable blowing agent and choosing the processing temperature such that it is above the decomposition temperature of the blowing agent. The bubbles of gas evolved by the blowing agent are entrapped within the molten resin, thereby forming a cellular structure that are commercially useful articles such as pipe, decorative molding and structural siding. Usually, the polymer is melted at a temperature between 150° and 200° C. and it is necessary to include a stabilizer in the formulation for the purpose of eliminating or at least minimizing the heat-induced discoloration of the vinyl chloride polymer which would otherwise occur at these temperatures. Also, when the decomposition temperature of the blowing agent is much above the processing temperature, activators are employed to hasten the decomposition of the blowing agent and/or lower the decomposition temperature. The combination of a blowing agent and an activator increases both the degree and the rate of blowing agent decomposition. The resultant larger volume of gas generated is desirable, since it reduces the amount of blowing agent required.

It is a well known fact that a variety of organotin compounds, particularly dimethyltin derivatives of mercaptocarboxylic acid esters, will impart useful levels of heat stability to vinyl chloride polymers. German Pat. Nos. 2,133,372 and 2,047,969 disclose the use of organotin mercaptocarboxylic acid estets in foamed polyvinyl chloride. These compounds stabilize well but do not effectively activate blowing agents such as azobisformamide. Organotin carboxylates such as dibutyltin maleate, dibutyltin dilaurate and dibutyltin maleate-half esters are disclosed in Japanese Pat. No. 6264/67 as being useful in flexible, i.e., plasticized, polymer foams. Although these organotin compounds activate azodicarbonamides, they are poor thermal stabilizers for the polymer. Thus, it can be seen that organotin mercaptocarboxylic acid esters impart good thermal stability but poor blowing agent activation, while organotin carboxylates offer good activation, but poor thermal stability with a resultant lack of proper melt viscosity control.

Dworkin et al teaches in U.S. Pat. No. 3,953,385 that organotin carboxylates provide only marginal improvement in the activation of a blowing agent when combined with the organotin mercaptocarboxylic acid esters described therein. In contrast to that teaching, we have found that organotin chlorides, in combination with organotin mercaptocarboxylic acid esters and with sulfides of such esters, are unexpectedly good activators for blowing agents such as the azobiscarbonamides, 5-phenyl tetrazole, and benzene sulfonylhydrazide in foamed polyvinyl chloride. The combination works well as a stabilizer for the vinyl chloride polymers.

SUMMARY OF THE INVENTION

It is an object of this invention to provide more effective activators for the blowing agents in the preparation of foamed vinyl chloride polymers.

It is another object of this invention to provide a method for reducing the density of foamed vinyl chloride polymers while also reducing the amount of blowing agent.

It is a further object of this invention to provide foamed poly(vinyl chloride) articles having reduced density and containing reduced amounts of the blowing agent by-products and the blowing agent activator.

These and other objects which will become apparent from the following description of the invention are achieved by a composition comprising:

a vinyl chloride polymer, a blowing agent, an organotin halide having the formula:

$$R_{(4-x)}SnX_x \qquad \text{I}$$

wherein R is an alkyl or cycloalkyl group having from 1 to 30 carbon atoms, X is a halogen of atomic weight 35 to 127, and x is from 1 to 3; and at least one stabilizer selected from the group consisting of:

(A) an organotin mercaptide of a mercaptocarboxylic acid ester having the formula:

$$R^1_{(4-y)}Sn[SZ(COOR^2)_m]_y \qquad \text{II}$$

wherein $R^1$ is an alkyl or cycloalkyl group having from 1 to 30 carbon atoms, Z is a Alkylene radical having from 1 to 30 carbon atoms, $R^2$ is an organic group derived from an alcohol having from 1 to 4 hydroxyl groups and from 1 to 30 carbon atoms, m is an integer from 1 to 4, and y is any number from 1 to 3; with the proviso that when y is less than 3, the $R^1$ groups may be the same or different, and when m is more than 1, the $R^2$ groups may be the same or different, and (B) a sulfide of an organotin mercaptide of Formula II.

The sulfide may be made by mixing an alkaline aqueous solution, a mercaptocarboxylic acid ester of Formula II, an alkali metal-, an alkaline earth metal-, or ammonium sulfide, and an organotin chloride having the formula:

$$R^3_{(4-z)}SnCl_z \qquad \text{III}$$

wherein $R^3$ is an alkyl or cycloalkyl group having from 1 to 30 carbon atoms, and z is any number from 1 to 3.

Alternatively, the sulfide may be made by mixing a monoalkyl- or dialkyltin sulfide with an organotin mercaptide of Formula II, and by other procedures well known in the stabilizer art. The sulfide is believed to include bis[monoorganotin)-bis(mercaptocarboxylate)] monosulfides and polysulfides, bis[(diorganotin)-mono(mercaptocarboxylate)]monosulfides and polysulfides, and products which arise during equilibrium reactions among said mono- and polysulfides, including monoalkyltin tris (mercaptocarboxylates), dialkyltin bis (mercaptocarboxylates), and oligomeric mono- and di-organotin mono- and polysulfides. The sulfide may be described further by the formula:

$$[R^4_{0-1}-\underset{|}{\overset{R^5}{Sn}}-S-Z^1-[C(=O)OR^6]_n]_p S_q \qquad \text{IV}$$

wherein $R^4$ is a hydrocarbyl radical; $R^5$ is a hydrocarbyl radical or -S-Z-[C(=O)OR$^6$]; $Z^1$ is Alkylene radical having from 1 to 30 carbon atoms; $R^6$ is hydrogen, a hydrocarbyl radical, a hydroxyhydrocarbyl radical, or $R^7$—OC(=O)R$^8$, wherein $R^7$ is $(CH_2)_k$, phenylene, or —CH=CH—, and $R^8$ is a hydrocarbyl radical; n is an integer from 1 to 3, p is from 1 to 2, q is from 1 to 10, k is 0 or an integer from 1 to 8, and the valency of $Z^1$ is n+1; with the proviso that it includes products arising from an equilibrium among the —SnR$^4$, —SnR$^5$, and —Sn—S—Z$^1$ —[C(=O)OR$^6$]$_n$ moieties, as recited above.

DETAILED DESCRIPTION OF THE INVENTION

The vinyl chloride polymers are made from monomers consisting of vinyl chloride alone or a mixture of monomers comprising, preferably, at least about 70% by weight based on the total monomer weight of vinyl chloride. They are exemplified by copolymers of vinyl chloride with from about 1 to about 30% of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinyl acetate (87:13), vinyl chloride-vinyl acetate-maleic anhydride (86:13:1), vinyl chloride-vinylidene chloride (95:5); vinyl chloride-diethyl fumarate (95:5), and vinyl chloride 2-ethylhexyl acrylate (80:20).

The vinyl chloride polymers, of course, constitute the major portion of the compositions of this invention. Thus, they amount to from about 70% to about 95% by weight of the total weight of the unfoamed compositions of this invention.

The blowing agent may be any one or a mixture of those commonly used for foaming PVC pipe, including azobisformamide, 5-phenyl tetrazole, benzene sulfonyl hydrazide, the formula for the azobisformamide is:

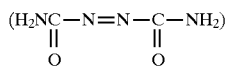

Azobisformamide is available under the CELOGEN AZRV trademark. The concentration of said blowing agent is suitably from about 0.1 and 5.0% but preferably from about 0.2 to about 3% by weight of the total composition prior to the formation of foam.

In the organotin halide of Formula I, R is exemplified by methyl, ethyl, propyl, isopropyl, n-butyl, isobutyl, tert-butyl, amyl, hexyl, octyl, isononyl, monyl, decyl, undecyl 2-ethylhexyl, iso-octyl, lauryl, palmityl, stearyl, myristyl, behenyl, cyclobutyl, cyclohexyl, methyl cyclohexyl and cyclopentyl. Hal is preferably chlorine. The organotin halides are exemplified by butyltin trichloride, dimethyltin dichloride, trioctyltin chloride, dioctyltin dichloride, dibutyltin dibromide, dibenzyltin dichloride, dibutyltin dichloride, dioctyltin dichloride, and monooctyltin trichloride. The organo radical preferably has from 1 to 8 carbon atoms and the methyl, butyl, and octyl tin groups are particularly preferred. The organotin chloride may comprise a mixture wherein x is from 2 to 3. The organotin halides may be prepared by methods well known in the art such as those disclosed in U.S. Pat. Nos. 3,745,183, 3,857,868, and 4,134,878.

The proportion of organotin halide in the unfoamed compositions of this invention is from about 5 to about 15% of the weight of the heat stabilizer used in the vinyl chloride polymer composition of this invention.

In the organotin mercaptide of Formula II, $R^1$ may be, for example, methyl, ethyl, propyl, isopropyl, n-butyl, isobutyl, tert-butyl, amyl, hexyl, octyl, isononyl, monyl, decyl, undecyl 2-ethylhexyl, iso-octyl, lauryl, palmityl, stearyl, myristyl, behenyl, cyclobutyl, cyclohexyl, methyl cyclohexyl and cyclopentyl. It preferably has from 1 to 8 carbon atoms, however, and the methyl, butyl, and octyl groups are particularly preferred. Octyl is defined to include 2-ethylhexyl as well as n-octyl and iso-octyl. Butyl is defined to include n-butyl, isobutyl, sec-butyl, and tert-butyl.

The Z group has from one to about thirty carbon atoms, such as an alkylene, arylene or cycloalkylene radical, and in addition may contain halogen, free carboxylic acid groups, keto groups, mercapto groups, carboxylic acid salt groups, ether groups and hydroxyl groups. It is preferred that Z is an alkylene group having from about 1 to about 8 carbon atoms.

$R^2$ is an organic group derived from a monohydric or polyhydric alcohol of the formula R' (OH)$_j$ where j is an integer from one to about four, but is preferably one or two. Thus, R' can be alkyl, alkylene, alkylenyl, aryl, arylene, alkaryl, aralkyl, cycloaliphatic and heterocyclic and may contain from about one to about thirty carbon atoms, and may also contain ester groups, alkoxy groups, hydroxyl groups, halogen atoms and other inert substituents. Preferably, R' is derived from a monohydric alcohol containing from one to about thirty carbon atoms, more preferably from eight to about twenty carbon atoms, and is exemplified by methyl, ethyl, propyl, n-butyl, t-butyl, isobutyl, octyl, isooctyl, 2-ethylhexyl, decyl, lauryl, octadecyl, myristyl, palmityl, oleyl, dodecyl, and ricinoleyl alcohols, cyclic monohydric alcohols, such as cyclopropanol, 2,2-dimethyl-1-cyclopropanol, cyclobutanol, 2-phenyl-1 -cyclobutanol, cyclopentanol, cyclopentenol, cyclohexanol, cyclohexenol, 2-methyl-, 3-methyl-, and 4-methyl-cyclohexanol, 2-phenyl-cyclohexanol, 3,3,5-trimethyl cyclohexanol, 1,4-cyclohexadiene-3-d, cycloheptanol, cycloheptene-3-d, 1,5-cycloheptadiene-3-ol, 2-methyl-, 3-methyl- and 4-methyl cycloheptanol, cyclooctanol, cyclooctenol, cyclononanol, cyclodecanol, cyclodecene-3-ol, cyclododecanol, the paramenthanols, such as 3-hydroxy-p-menthane, 2-hydroxy-p-menthane, the para-menthenols such as α-terpineol, borneol, pine oil, fenchol, 2,2-di-methyl-3,6-endo-methylene cyclohexanol, methyl borneol, 2,2-10-trimethyl-3,6-endomethylene cyclohexanol, the cyclic sesquiterphenols such as farnesol and nerolidol, the sterols such as cholesterol, dihydrocholesterol, ergosterol, 24-ethyl cholesterol, the condensed alicyclic alcohols such as 1-, and 2-hydroxyl-1, 2,3,4-tetrahydronaphthalene and 1-, and 2-hydroxydecahydronaphthalene, or from a dihydric alcohol such as glycols containing from two to about thirty carbon atoms, including ehtylene glycol, propylene glycol, diethylene glycol, dipropylene glycol, tetramethylene glycol, neopentyl glycol and decamethylene glycol, 2',2'-4-trimethyl pentane-diol, 2,2',4,4'-tetramethyl cyclobutane-diol, cyclohexane-1,4-dimethylanol, 4,4'-isopropylidene-dicyclohexanol, and polyols such as glycerine, triethylol propane, mannitol, sorbitol, erythritol, dipentaerythritol, pentaerythritol, and trimethylol propane.

The dimethyltin-, dibutyltin-, and dioctyltin- mercaptides of bis(octylthioglycolate) are particularly suitable for the purposes of this invention. Also, preferred are mixtures of mercaptides wherein from about 80 to about 85% of the total weight of the mixture are mercaptides in which y is about 2.

As further description of the chloride of Formula III, $R^3$ may be, for example, methyl, ethyl, propyl, isopropyl, n-butyl, isobutyl, tert-butyl, amyl, hexyl, octyl, isononyl, monyl, decyl, undecyl 2-ethylhexyl, iso-octyl, lauryl, palmityl, stearyl, myristyl, behenyl, cyclobutyl, cyclohexyl, methyl cyclohexyl and cyclopentyl. It preferably has from 1 to 8 carbon atoms, however, and the methyl, butyl, and octyl groups are particularly preferred. Octyl is defined to include 2-ethylhexyl as well as n-octyl and iso-octyl. Butyl is defined to include n-butyl, isobutyl, sec-butyl, and tert-butyl.

In Formula IV for the sulfide, $R^4$ and $R^5$ are preferably alkyl groups having from 1 to 8 carbon atoms but more preferably 1 carbon atom, $R^6$ is preferably an alkyl or cycloalkyl radical having from 1 to 17 carbon atoms, n is preferably 1, and q is preferably from 1 to 4 and more preferably from 1 to 2. $R^6$ may be, for example, methyl, ethyl, propyl, isopropyl, n-butyl, isobutyl, tert-butyl, amyl, hexyl, octyl, isononyl, monyl, decyl, undecyl 2-ethylhexyl, iso-octyl, lauryl, palmityl, stearyl, myristyl, behenyl, cyclobutyl, cyclohexyl, methyl cyclohexyl and cyclopentyl.

The $Z^1$ group may be, for example, an alkylene, arylene or cycloalkylene radical, and in addition may contain halogen, free carboxylic acid groups, keto groups, mercapto groups, carboxylic acid salt groups, ether groups and hydroxyl groups. It is preferably an alkylene group having from about 1 to about 8 carbon atoms.

The $S—Z—(COOR^2)_m$ and $S—Z^1—[(C=O)OR^6]_n$ groups are derived from mono- or polymercapto carboxylic acid esters by removal of the hydrogen atom of the mercapto group. These include the esters of aliphatic, aromatic, cycloaliphatic and heterocyclic acids which contain at least one mercapto group, and can also contain inert substituents such as halogen, hydroxyl, keto and alkoxy groups, such as, for example, esters of mercaptoacetic acid, α-mercaptopropionic acid, β-mercaptopropionic acid, mercaptooleic acid, mercaptoricinoleic acid, mercaptolinoleic acid, mercaptostearic acid, mercaptovaleric acid, mercaptohexanoic acid, mercaptooctanoic acid, thiolactic acid, mercaptolevulinic acid, mercaptolauric acid, mercaptobehenic acid, dithiotartaric acid, mercaptopalmitic acid, mercaptobenzoic acid, mercaptomethylbenzoic acid, mercaptocyclohexane carboxylic acid, 3-mercapto-2,3-dimethyl butyric acid, 2-mercaptobutyric acid, 3-mercaptobutyric acid, 3-mercapto-4-hydroxy butyric acid, 2-mercapto-3-methylbutyric acid, 3-mercapto-4,5-dimethylhexanoic acid, 3-mercaptohexanoic acid, 2-mercapto-6-hydroxyhexanoic acid, 3-mercapto-4-ethylhexanoic acid, thiomalic acid, thiocitric acid, 3-mercaptoglutaric acid, 2-mercaptosuberic acid, thiosalicyclic acid, 2-mercaptocyclohexane carboxylic acid, 3-mercapto-2-naphthoic acid, 3-mercaptofuroic acid, 2-mercaptolauric acid, thiomalic acid, mercaptoglutaric acid, mercaptoazelaic acid, mercaptomalonic acid, mercaptoadipic acid, mercaptopimelic acid, mercaptosuberic acid, mercaptosebacic acid, mercaptoterephthalic acid, and mixtures of these.

The organotin mercaptides of mercaptocarboxylic acid esters can be prepared readily by the reaction of the mercaptocarboxylic acid esters with the corresponding organotin oxides or chlorides. For a more complete explanation of the process for making, and for additional examples of these dis-organotin mercapto esters compounds, see U.S. Pat. Nos. 2,648,650 to Weinberg et al., 2,641,596 and 2,752,325 to Leistner, and 3,115,509 to Mack, and Canadian Patent No. 649,989 to Mack.

The organotin mercapto acid esters containing two different mercapto acid ester groups can be prepared by reacting the desired organotin oxide or chloride with a mixture of the mercapto acid esters, or by heating the two different organotin esters together.

The sulfides may be prepared by mixing an alkaline aqueous solution, a mercaptocarboxylic acid ester of Formula II, an alkali metal-, an alkaline earth metal-, or ammonium sulfide, and an organotin chloride according to any of several well known methods such as those taught by Kauder in U.S. Pat. No. 3,565,930 and Brecker in U.S. Pat. No. 3,565,931, both of which are incorporated herein by reference.

Examples of the chloride that may be used include methyltin trichloride, ethyltin trichloride, butyltin trichloride, sec. butyltin trichloride, octyltin trichloride, benzyltin trichloride, dimethyltin dichloride, dipropyltin dichloride, butyl methyl tin dichloride, dibutyltin dichloride, dioctyltin dichloride, dibenzyltin dichloride, phenyltin trichloride, p-tolyltin trichloride, diphenyltin dichloride, di-p-tolyltin dichloride, cyclohexyltin trichloride, dicyclohexyltin dichloride, cyclopentyltin trichloride, oleyltin trichloride, dioleyltin dichloride, vinyltin trichloride, diallyltin dichloride, allyltin trichloride, eicosanyltin trichloride.

The stabilizer components of the invention, including the organotin mercapto acid esters and the sulfides of organotin mercapto acid esters, are employed in an amount sufficient to impart the desired resistance to heat deterioration at working temperatures of 350° F. and above. The more rigorous the conditions to which the resin will be subjected during working and mixing, and the longer the term required for resisting degradation, the greater will be the amount of organotin mercapto acid ester required. Generally, as little as 0.25% total of the stabilizer components by weight of the resin, will give resistance to heat deterioration. They may be incorporated into the compositions by admixing in an appropriate mill or mixer or by any of the other well known methods which provide for the uniform distribution of the stabilizers throughout the composition. The preparation of the polyvinyl chloride resin composition is easily accomplished by conventional procedures. For example, the selected stabilizer combination may be formed as above, and then blended with the polyvinyl chloride resin on a two or three roll mill at a temperature at which the mix is fluid and thorough blending facilitated, e.g., at from 250 to 375° F., for a time sufficient to form a homogeneous mass. After the mass is uniform, it is sheeted off in the usual way.

There is no critical upper limit on the amount, but amounts above about 10% by weight of the resin do not give an increase in stabilizing effectiveness commensurate with the additional stabilizer employed. Preferably, the amount is from about 0.5 to about 5% by weight of the resin.

The stabilizer combination of the invention can be employed together with other polyvinyl chloride resin stabilizers. The stabilizer combination of the invention in this event will be the major stabilizer, and the additional stabilizer will supplement the stabilizing action of the former, the amount of the stabilizer combination being within the range from about 0.25 to about 15 parts by weight per 100 parts of the resin, and the additional stabilizer being in an amount of from about 0.05 to about 10 parts per 100 parts of the resin.

Among the additional metallic stabilizers are included other organotin compounds, polyvalent metal salts of medium and or high molecular weight fatty acids and phenols, with metal such as calcium, tin cadmium, barium, zinc, magnesium and strontium.

In addition to the blowing agent activator-heat stabilizer compositions described in the foregoing specification and appended claims, the vinyl chloride polymer compositions of this invention may contain additives for the purpose of increasing, resistance to oxidation, flame retardancy and impact resistance of the polymer. Pigments, fillers, dyes, ultraviolet light absorbing agents and the like may also be present. Conventional processing aids such as lubricants and acrylic resins can also be present.

Acrylic resins are employed in the compositions of this invention as processing aids to improve melt elasticity and strength and to prevent the collapse of the cellular structure during processing. The amount of the acrylic resin is from about 2 to about 15 parts per hundred parts of the vinyl chloride polymer. The molecular weight of the resin may be in the range of from 300,000 to 1,500,000 but those having the higher molecular weights are preferred; resins having a molecular weight of 1,000,000 and higher are particularly preferred. Examples of the acrylic processing aids include those sold by Rohm & Haas under the trademark ACRYLOID and product numbers K-175, and K-400.

A small amount, usually not more than 1.5%, of a parting agent or lubricant, also can be included. Typical parting agents are the higher aliphatic acids, and salts having twelve to twenty-four carbon atoms, such as stearic acid, lauric acid, palmitic acid and myristic acid, lithium stearate and calcium palmitate, mineral lubricating oils, polyvinyl stearate, polyethylene and paraffin wax.

Impact modifiers, for improving the toughness or impact-resistance of unplasticized resins, can also be added to the resin compositions stabilized by the present invention in minor amounts of usually not more than 10%. Examples of such impact modifiers include chlorinated polyethylene, ABS polymers, and polyacrylate-butadiene graft copolymers.

Among the antioxidants suitable for use in the present polymer compositions are phenols, particularly those wherein the positions adjacent to the carbon atom bearing the hydroxyl radical contain alkyl radicals as substituents. Phenols wherein this alkyl radical is sterically bulky, e.g. a tertiary butyl radical, are preferred.

A small amount, usually not more than 0.1%, of a metal release agent, such as an oxidized polyethylene, also can be included.

The effect of the blowing agent activator is independent of whether it is added to the vinyl chloride polymer as an aqueous solution, as part of a stabilizer package, or as part of a lubricant package. A variety of conventional molding and extruding techniques may be used to form the rigid, cellular vinyl chloride polymers of this invention into pipe or any desired profile or a sheet.

The following examples illustrate this invention more specifically. Unless otherwise indicated, all parts and percentages in these examples and throughout this specification are by weight. ABF is an abbreviation of azobisformamide.

EXAMPLE 1 & COMPARATIVE EXAMPLE 1

PVC pipe formulations A and B were processed in a Brabender ¾ inch extruder having a 25/1 length to diameter ratio and a straight flight screw having a 2/1 compression ratio and a die orifice of 5 mm. The temperature profile (° C.) was:

Zone 1 155 Zone 2 158 Zone 3 170 Die 170.

The formulations for the product of Example 1 and for the Comparative Example are the same except for the addition of the monomethyltin trichloride in Example 1 as shown in the following table. The extrusion results are also given in the table.

TABLE 1

|  | Comp. Ex. 1 | Example 1 |
|---|---|---|
| FORMULATION |  |  |
| PVC | 100 | 100 |
| Acrylic resin |  |  |
| K-400 | 6 | 6 |
| K-175 | 6 | 6 |
| CaCO$_3$ | 5 | 5 |
| TiO$_2$ | 1 | 1 |
| Ca stearate | 1.2 | 1.2 |
| AC-629* | 0.08 | 0.08 |
| Paraffin wax | 0.75 | 0.75 |
| Azobisformamide | 0.35 | 0.35 |
| Monomethyltin trichloride | 0.00 | 0.10 |
| Extrusion Results |  |  |
| RPM | 60 | 60 |
| Torque m. gm. | 5300 | 5100 |
| Melt temp. (orifice) | 192 | 192 |
| Output gm/min | 68.2 | 67.6 |
| Foam Density gm/cc | 0.58 | 0.54 |

*trademark for oxidized polyethylene

EXAMPLE 2, AND COMP EXAMPLE 2

The rate of gas evolution during the decomposition of the blowing agent in the presence a stabilizer was measured by immersing a test tube fitted with a means for trapping the evolved gas and containing 1 gram of blowing agent and 10 grams of stabilizer in an oil bath maintained at 200° C. The volume of gas was recorded at 1 minute intervals for the first five minutes and then at five minute intervals for the next 25 minutes. The stabilizer in Comparative Example 2 was dimethyltin bis(di-ethylhexyl thioglycolate) and in Example 2 it was dimethyltin bis(di-ethylhexyl thioglycolate) plus 10% of monomethyltin trichloride by weight of the thioglycolate. The data is given in Table 2.

TABLE 2

|  | Milliliters of Gas Evolved | |
|---|---|---|
| TIME, minutes | Ex. 2 | CE 2 |
| 1 | 7 | 0 |
| 2 | 15 | 5 |
| 3 | 87 | 20 |
| 4 | 102 | 77 |
| 5 | 107 | 82 |
| 10 | 122 | 90 |
| 15 | 132 | 95 |
| 20 | 142 | 102 |
| 25 | 155 | 110. |

The subject matter claimed is:

1. A composition comprising a vinyl chloride polymer, a blowing agent, an organotin halide having the formula:

$$R_{(4-x)}SnX_x \qquad \text{I}$$

wherein R is an alkyl radical having from 1 to 18 carbon atoms, and X is halogen of atomic weight 35 to 127, and x is from 1 to 3; and at least one stabilizer selected from the group consisting of:

(A) an organotin mercaptide of a mercaptocarboxylic acid ester having the formula;

$$R^1_{(4-y)}Sn[SZ(COOR^2)_m]Y \qquad \text{II}$$

wherein $R^1$ is an alkyl or cycloalkyl group having from 1 to 30 carbon atoms, Z is an alkylene radical having from 1 to 30 carbon atoms, $R^2$ is an organic group derived from an alcohol having from 1 to 4 hydroxyl groups and from 1 to 30 carbon atoms, m is 1, and y is any number from 1 to 3; with the proviso that when y is less than 3, the $R^1$ groups may be the same or different, and (B) a sulfide of an organotin mercaptide of Formula II

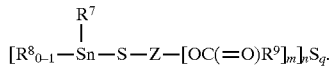

2. The composition of claim 1 wherein Z is an alkylene radical.

3. The composition of claim 1 wherein mercaptides in which y is about 2 are from about 80 to about 85% of the total weight of the mercaptides.

4. The composition of claim 2 wherein R is an alkyl group having from 1 to 8 carbon atoms.

5. The composition of claim 1 wherein the sulfide has the formula:

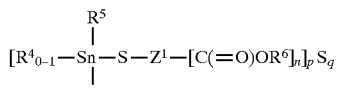

wherein $R^4$ is a hydrocarbyl radical; $R^5$ is a hydrocarbyl radical or $-S-Z-[C(=O)OR^6]$; $Z^1$ is an alkylene radical having from 1 to 30 carbon atoms; $R^6$ is hydrogen, a hydrocarbyl radical, a hydroxyhydrocarbyl radical, or $R^7-OC(=O)R^8$, wherein $R^7$ is $(CH_2)_k$, phenylene, or $-CH=CH-$, and $R^8$ is a hydrocarbyl radical; n is 1, p is from 1 to 2, q is from 1 to 10, k is 0 or an integer from 1 to 8; with the proviso that it includes products arising from an equilibrium among the $-SnR^4$, $-SnR^5$, and $-Sn-S-Z^1-[C(=O)OR^6]$ moieties.

6. The composition of claim 1 wherein $R^2$ is an organic group derived from a monohydric alcohol having from 8 to 20 carbon atoms.

7. The composition of claim 2 wherein $R^2$ is an organic group derived from a monohydric alcohol having from 8 to 20 carbon atoms.

8. The composition of claim 5 wherein $R^2$ is an organic group derived from a monohydric alcohol having from 8 to 20 carbon atoms.

9. The composition of claim 8 wherein $Z^1$ is an alkylene radical.

* * * * *

UNITED STATES PATENT AND TRADEMARK OFFICE
CERTIFICATE OF CORRECTION

PATENT NO. : 5,866,625
DATED : February 2, 1999
INVENTOR(S) : Beekman et al.

Page 1 of 2

It is certified that error appears in the above-indentified patent and that said Letters Patent is hereby corrected as shown below:

Title should be "Improved PVC Foam Compositions".

Col. 1, Ln. 38 - estets should be esters.

Col. 2, Ln. 27 - Alkylene should be alkylene.

Col. 2, Ln. 30 - "M is an integer from 1 to 4" should be "M is 1"

Col. 2, Lns. 32-33, delete "and when M is more than 1, the $R_2$ groups may be the same or different".

Col. 2, Ln. 64, $-S-Z^1-[C(=O)OR^6]$ should be $S-Z'-[C(=O)OR^6]_n$.

Col. 2, Ln. 64 - "Alkylene" should be alkylene.

Col. 3, Ln. 1 - "n is an integer from 1 to 3" should be "n is 1".

Col. 9, Ln 29, $-S-Z-[C(=O)OR^6]$ should be $-S-Z^1-[C(=O)OR^6]_n$.

Col. 10, Lns. 8-9, $-Sn-S-Z'-[C(=O)or^6]$ should be $-Sn-S-Z'-[C(=O)OR^6]_n$

UNITED STATES PATENT AND TRADEMARK OFFICE
CERTIFICATE OF CORRECTION

Page 2 of 2

PATENT NO. : 5,866,625
DATED : February 2, 1999
INVENTOR(S) : Beekman et al.

It is certified that error appears in the above-indentified patent and that said Letters Patent is hereby corrected as shown below:

Column 9, lines 10-12        Delete the formula before the period.

Signed and Sealed this

Fourteenth Day of December, 1999

Attest:

Q. TODD DICKINSON

*Attesting Officer*  *Acting Commissioner of Patents and Trademarks*